(12) United States Patent
Kakuho et al.

(10) Patent No.: US 10,472,187 B2
(45) Date of Patent: Nov. 12, 2019

(54) ELECTRONIC COMPONENT TRANSPORTATION DEVICE AND METHOD FOR MANUFACTURING ELECTRONIC COMPONENT ARRAY

(71) Applicant: Murata Manufacturing Co., Ltd., Nagaokakyo-shi, Kyoto-fu (JP)

(72) Inventors: Masaru Kakuho, Nagaokakyo (JP); Naoto Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/885,854

(22) Filed: Feb. 1, 2018

(65) Prior Publication Data

US 2018/0155138 A1    Jun. 7, 2018

Related U.S. Application Data

(63) Continuation of application No. 15/256,821, filed on Sep. 6, 2016, now Pat. No. 9,919,880.

(30) Foreign Application Priority Data

Sep. 10, 2015   (JP) .................................. 2015-178798

(51) Int. Cl.
    *B65G 54/02*       (2006.01)
    *B65G 47/248*      (2006.01)
    (Continued)

(52) U.S. Cl.
    CPC ........... *B65G 54/02* (2013.01); *B65G 47/248* (2013.01); *H01G 13/00* (2013.01); *H01G 4/005* (2013.01); *H01G 4/30* (2013.01)

(58) Field of Classification Search
    CPC .... B65G 47/1485; B65G 47/24; B65G 54/02; B65G 47/248
    (Continued)

(56) References Cited

U.S. PATENT DOCUMENTS 3,120,890 A * 2/1964 Waltz ................. B65G 47/1471
                                                    198/381
3,558,004 A * 1/1971 Boyd, Jr. .................. A61J 7/02
                                                    198/390

(Continued)

FOREIGN PATENT DOCUMENTS

JP    2001-150249 A    6/2001
JP    2003-069285 A    3/2003
(Continued)

OTHER PUBLICATIONS

Kakuho et al., "Electronic Component Transportation Device and Method for Manufacturing Electronic Component Array", U.S. Appl. No. 15/256,821, filed Sep. 6, 2016.

(Continued)

*Primary Examiner* — James R Bidwell
(74) *Attorney, Agent, or Firm* — Keating & Bennett, LLP

(57) ABSTRACT

An electronic component transportation device includes a rotation path and a first magnetic force generator. The rotation path extends along a transportation direction of an electronic component with a rectangular or substantially rectangular parallelepiped shape. The rotation path is inclined with respect to a horizontal direction. The rotation path includes a first surface and a second surface intersecting with each other. The first magnetic force generator is arranged at a lateral side of the rotation path.

13 Claims, 11 Drawing Sheets

(51) Int. Cl.
*H01G 4/30* (2006.01)
*H01G 13/00* (2013.01)
*H01G 4/005* (2006.01)

(58) Field of Classification Search
USPC ................................. 198/381, 390, 389, 383
See application file for complete search history.

(56) References Cited

U.S. PATENT DOCUMENTS

| | | | | |
|---|---|---|---|---|
| 3,732,967 A * | 5/1973 | Francis | ................... | B65G 47/24 |
| | | | | 193/44 |
| 3,989,164 A * | 11/1976 | Hager | ..................... | B65G 47/24 |
| | | | | 221/212 |
| 4,113,142 A * | 9/1978 | Ryzhov | .................. | B65G 47/26 |
| | | | | 198/381 |
| 6,152,281 A * | 11/2000 | Bednarz | ............... | H05K 13/028 |
| | | | | 198/381 |
| 9,919,880 B2 * | 3/2018 | Kakuho | .................. | B65G 54/02 |
| 2012/0138350 A1 | 6/2012 | Chae et al. | | |

FOREIGN PATENT DOCUMENTS

| | | |
|---|---|---|
| JP | 2011-018698 A | 1/2011 |
| JP | 2012-119660 A | 6/2012 |

OTHER PUBLICATIONS

Official Communication issued in Japanese Patent Application No. 2015-178798, dated Mar. 19, 2019.

* cited by examiner

ELECTRONIC COMPONENT TRANSPORTATION DEVICE AND METHOD FOR MANUFACTURING ELECTRONIC COMPONENT ARRAY

CROSS REFERENCE TO RELATED APPLICATIONS

This application claims the benefit of priority to Japanese Patent Application 2015-178798 filed Sep. 10, 2015, the entire contents of this application are hereby incorporated herein by reference.

BACKGROUND OF THE INVENTION

1. Field of the Invention

The present invention relates to an electronic component transportation device and a method for manufacturing an electronic component array.

2. Description of the Related Art

As one type of electronic components, a multilayer ceramic capacitor has been known. In the multilayer ceramic capacitor, a plurality of inner electrodes and a ceramic dielectric layer are laminated.

The multilayer ceramic capacitor is mounted on a substrate for use, in general. When the multilayer ceramic capacitor is mounted on the substrate, mechanical strength is different, a stray capacitance value varies, and so on between the case in which the lamination direction of the inner electrodes is parallel to the surface of the substrate and the case in which the lamination direction thereof is perpendicular to the surface of the substrate in some cases.

Furthermore, the magnitude of acoustic noise is different between the case in which the lamination direction of the inner electrodes is parallel to the surface of the substrate and the case in which the lamination direction thereof is perpendicular to the surface of the substrate in some cases. The "acoustic noise" referred herein indicates sound that is generated when the substrate vibrates due to distortion of the multilayer ceramic capacitor, which is caused by fluctuation of voltage to be applied.

Accordingly, it is desired that the multilayer ceramic capacitor is mounted on the substrate in a state in which the lamination direction of the inner electrodes is aligned with a predetermined direction.

Japanese Unexamined Patent Application Publication No. 2011-018698 discloses an example of an electronic component transportation device aligning a multilayer ceramic capacitor with a predetermined direction. The transportation device disclosed in Japanese Unexamined Patent Application Publication No. 2011-018698 has a first transportation path, a rotation path, and a second transportation path. A first magnet is provided in the rotation path so as to apply a magnetic force to an electronic component such that inner electrodes in the electronic component extend in a predetermined direction. The rotation path has transition guide walls, and a gap between the walls is narrower toward an end portion connected to the second transportation path.

The electronic component transportation device disclosed in Japanese Unexamined Patent Application Publication No. 2011-018698 has a problem that a posture of the electronic component passing through the rotation path tilts and the electronic component is easily stuck.

SUMMARY OF THE INVENTION

Accordingly, preferred embodiments of the present invention provide an electronic component transportation device in which an electronic component is unlikely to be stuck in a transportation path.

A first electronic component transportation device according to a preferred embodiment of the present invention includes a rotation path and a first magnetic force generator. The rotation path extends along a transportation direction of an electronic component preferably with a rectangular or substantially rectangular parallelepiped shape. The rotation path is inclined with respect to a horizontal direction. The rotation path includes a first surface and a second surface intersecting with each other. The first magnetic force generator is arranged at a lateral side of the rotation path.

In the first electronic component transportation device according to a preferred embodiment of the present invention, it is preferable that an angle defined by the first surface and the second surface is not 90° or about 90°.

In the first electronic component transportation device according to a preferred embodiment of the present invention, it is preferable that an angle defined by the first surface and the second surface is larger than about 90°.

In the first electronic component transportation device according to a preferred embodiment of the present invention, it is preferable that the first magnetic force generator is at a lateral side of the first surface of the rotation path, and an inclination angle of the first surface with respect to the horizontal direction is larger than an inclination angle of the second surface with respect to the horizontal direction.

In the first electronic component transportation device according to a preferred embodiment of the present invention, it is preferable that a center line passing through an N pole and an S pole of the first magnetic force generator passes through the first surface, and L1>D/2 is satisfied when a minimal distance between an intersection of the center line and the first surface and an intersection of the first and second surfaces is assumed to be L1 and a larger dimension of a width and a height of the electronic component is assumed to be D.

It is preferable that the first electronic component transportation device according to a preferred embodiment of the present invention further include a second magnetic force generator at a lateral side of the second surface of the rotation path and at a downstream side relative to the first magnetic force generator.

It is preferable that the first electronic component transportation device according to a preferred embodiment of the present invention include a cover covering the rotation path.

A second electronic component transportation device according to another preferred embodiment of the present invention includes a rotation path and a first magnetic force generator. The rotation path includes a first path portion and a second path portion. The first path portion extends along a transportation direction of an electronic component. The first path portion is inclined with respect to a horizontal direction. The first path portion includes first and second surfaces intersecting with each other. The second path portion extends along the transportation direction. The second path portion is inclined with respect to the horizontal direction. The second path portion includes third and fourth surfaces intersecting with each other. The second path portion is located at the first surface side of the first path portion. An upper end of the first surface and an upper end of the fourth surface are connected. A minimal distance between a lower end and the upper end of the first surface is smaller than a larger dimension of a width and a height of the electronic component to be transported. The first magnetic force generator is arranged at a lateral side of the third surface of the rotation path.

In the second electronic component transportation device according to a preferred embodiment of the present invention, it is preferable that S1>S2 is satisfied when an area of a portion of a surface of the first magnetic force generator facing the third surface, which is overlapped with the third surface in a direction perpendicular or substantially perpendicular to the third surface, is assumed to be S1 and an area of a portion of the surface of the first magnetic force generator facing the third surface, which is not overlapped with the third surface, is assumed to be S2.

A method for manufacturing an electronic component array according to a still another preferred embodiment of the present invention includes a step of aligning lamination directions of a plurality of electronic components using the first or second electronic component transportation device.

It is preferable that the method for manufacturing an electronic component array according to a preferred embodiment of the present invention further include a step of accommodating the plurality of electronic components in a tape such that the lamination directions of the plurality of electronic components are aligned.

Preferred embodiments of the present invention provide an electronic component transportation device in which an electronic component is unlikely to be stuck in a transportation path.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
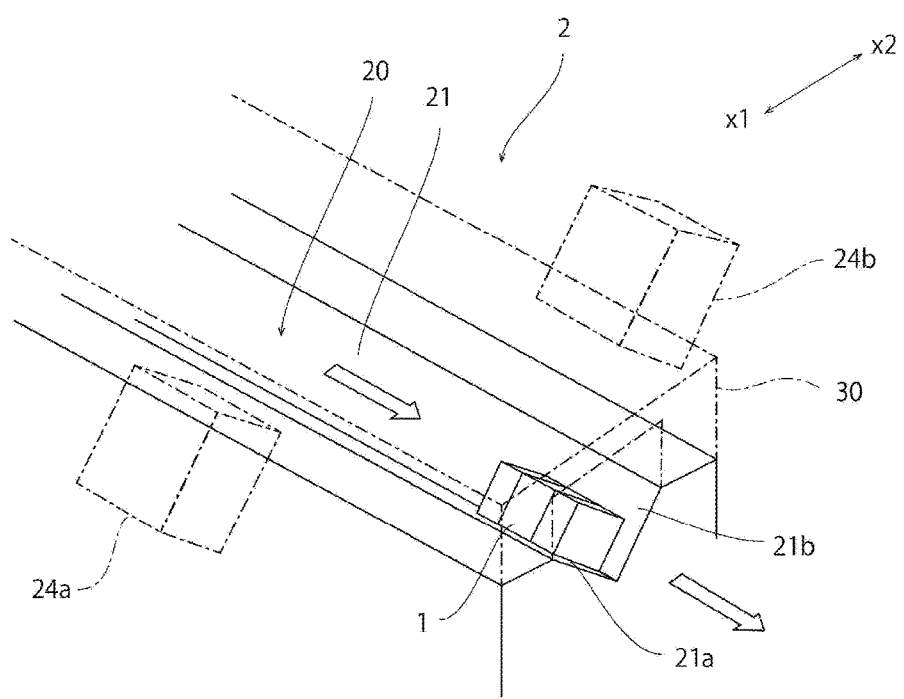
FIG. 1 is a schematic perspective view illustrating a portion of an electronic component transportation device according to a first preferred embodiment of the present invention.

Hereinafter, examples of preferred embodiments of the present invention will be described. It should be noted that the following preferred embodiments are merely examples. The present invention is not limited by the following preferred embodiments at all.

In each of the drawings that are referred in the preferred embodiments and the like, the same reference numerals denote members having the same or substantially the same functions. Furthermore, the drawings that are referred in the preferred embodiments and the like are schematically illustrated. Ratios and the like of dimensions of objects drawn in the drawings are different from ratios and the like of dimensions of actual objects in some cases. The ratios and the like of the dimensions of the objects are different among the drawings in some cases. The specific ratios and the like of the dimensions of the objects should be determined by considering the following description.

First Preferred Embodiment

FIG. 1 is a schematic perspective view illustrating a portion of an electronic component transportation device according to a preferred embodiment of the present invention. An electronic component transportation device 2 illustrated in FIG. 1 is a device that transports an electronic component 1. The electronic component 1 that is transported is not particularly limited and preferably has a rectangular or substantially rectangular parallelepiped shape, for example.

Figure 2:
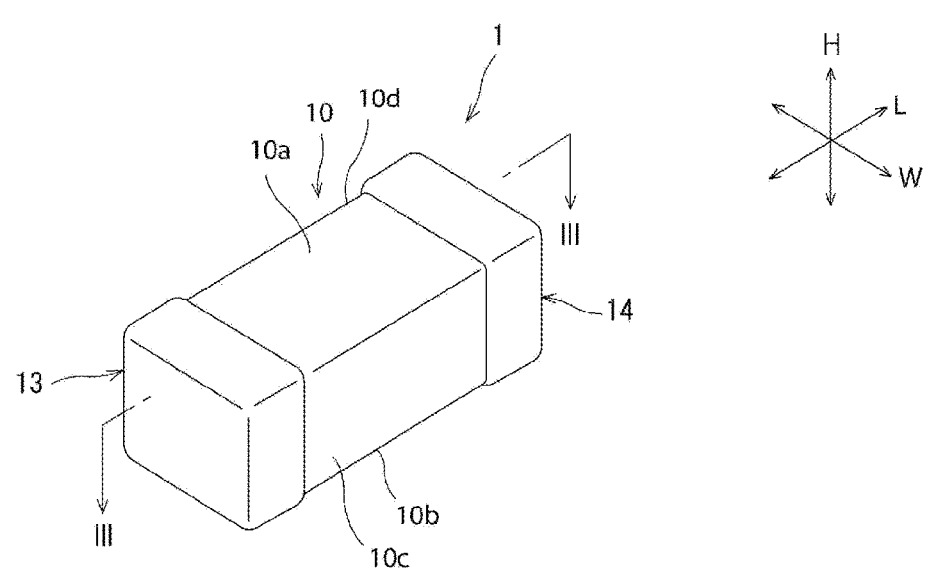
FIG. 2 is a schematic perspective view illustrating an electronic component that is transported according to the first preferred embodiment of the present invention.
Figure 3:
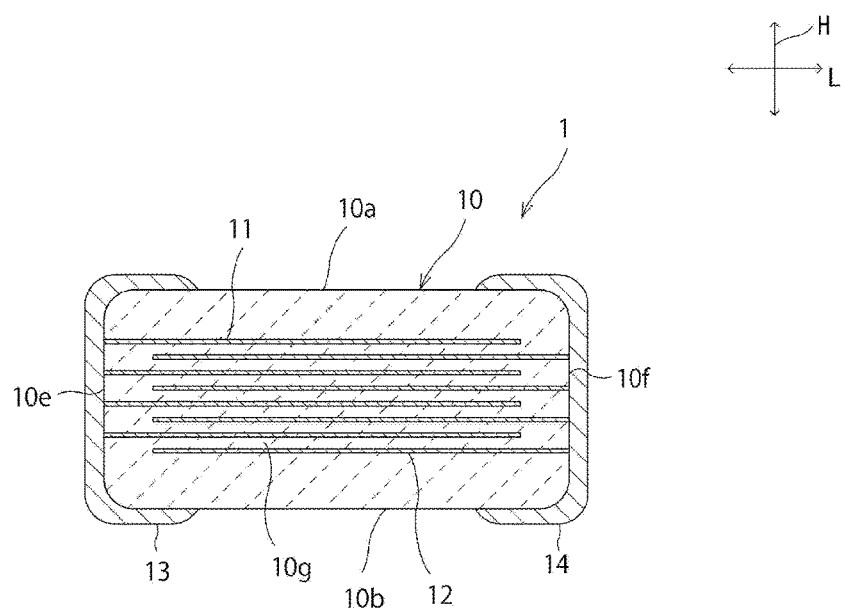
FIG. 3 is a schematic cross-sectional view cut along a line III-III in FIG. 2.

To be specific, in the present preferred embodiment, an example in which the electronic component 1 illustrated in FIG. 2 and FIG. 3 is transported by the electronic component transportation device 2 will be described.

FIG. 2 is a schematic perspective view illustrating the electronic component 1 that is transported in the present preferred embodiment. FIG. 3 is a schematic cross-sectional view cut along a line III-III in FIG. 2.

The electronic component 1 illustrated in FIG. 2 and FIG. 3 preferably is a capacitor having a rectangular or substantially rectangular parallelepiped shape, for example. To be specific, the electronic component 1 preferably is a multilayer ceramic capacitor having a rectangular or substantially rectangular parallelepiped shape, for example. It is preferable for the electronic component 1 to have large electrostatic capacitance which can easily generate acoustic noise, in particular, it is preferable for the electronic component 1 having an electrostatic capacitance equal to or larger than about 1 μF or equal to or larger than about 10 μF.

The electronic component of various preferred embodiments of the present invention is not limited to the capacitor. In preferred embodiments of the present invention, the electronic component may be a thermistor, an inductor, or the like.

The electronic component 1 includes a main body 10. The main body 10 preferably has a rectangular or substantially rectangular parallelepiped shape, for example. It should be noted that the rectangular or substantially rectangular parallelepiped shape encompasses a rectangular parallelepiped shape and a shape formed by rounding corners and ridge line portions of the rectangular parallelepiped shape.

As illustrated in FIG. 3, the main body 10 includes first and second main surfaces 10a and 10b, first and second side surfaces 10c and 10d, and first and second end surfaces 10e and 10f. Each of the first and second main surfaces 10a and 10b extends along a length direction L and a width direction W. The length direction L and the width direction W are perpendicular or substantially perpendicular to each other. Each of the first and second side surfaces 10c and 10d extends along the length direction L and a height direction H. The height direction H is perpendicular or substantially perpendicular to each of the length direction L and the width direction W. Each of the first and second end surfaces 10e and 10f extends along the width direction W and the height direction H.

A dimension of the main body 10 in the length direction L is larger than dimensions thereof in the width direction W and the height direction H and the dimension of the main body 10 in the width direction W is equal or substantially equal to a dimension of the main body 10 in the height direction H. To be specific, the dimension of the main body 10 in the width direction W is equal to or larger than about 0.8 times as and equal to or smaller than about 1.2 times as the dimension of the main body 10 in the height direction H, for example. It should be noted that the dimension of the main body 10 in the width direction W and the dimension thereof in the height direction H may be different. The electronic component transportation device according to a preferred embodiment of the present invention is more advantageous than an existing transportation device to transport and rotate the electronic component 1 in the following point. That is, the electronic component transportation device according to a preferred embodiment of the present invention is capable of being applied to the electronic component 1 in which the dimension of the main body 10 in the width direction W and the dimension thereof in the height direction H are different.

To be specific, as a dimension facilitating rotation of the electronic component 1 with magnetic force, in the present preferred embodiment, it is preferable that the dimension of the electronic component main body 10 in the length direction L be equal to or larger than about 0.6 mm and equal to or smaller than about 2.0 mm, for example. It is preferable that the dimension of the electronic component main body 10 in the width direction W be equal to or larger than about 0.3 mm and equal to or smaller than about 1.0 mm, for example. It is preferable that the dimension of the electronic component main body 10 in the height direction H be equal to or larger than about 0.3 mm and equal to or smaller than about 1.0 mm, for example.

The electronic component main body 10 preferably is made of dielectric ceramics as a main component for obtaining electrostatic capacitance. Specific examples of the dielectric ceramics include $BaTiO_3$, $CaTiO_3$, $SrTiO_3$, and the like. A sub component content of which is smaller than that of the main component, such as Mn compound, Mg compound, Si compound, Fe compound, Cr compound, Co compound, Ni compound, and rare-earth compound, for example, may be appropriately added to the electronic component main body 10 in accordance with characteristics required for the electronic component 1. The dielectric ceramic material is preferably ferroelectric ceramic and relative dielectric constant thereof is preferably equal to or higher than about 2000, and more preferably equal to or higher than about 3000, for example. In this case, the electrostatic capacitance of equal to or larger than about 1 μF or equal to or larger than about 10 μF is able to be achieved within the above-described dimensional range of the electronic component main body 10. The electronic component 1 easily generates acoustic noise and preferred embodiments of the present invention are able to be preferably applied thereto.

As illustrated in FIG. 3, a plurality of first inner electrodes 11 and a plurality of second inner electrodes 12 defining inner conductors are provided in the electronic component main body 10.

The first inner electrodes 11 and the second inner electrodes 12 are alternately laminated along the height direction H and oppose each other with a ceramic portion 10g interposed therebetween in the height direction H. From the viewpoint that the numbers of inner electrodes 11 and 12 are increased to accelerate rotation with magnetic force, the thickness of the ceramic portion 10g is preferably equal to or smaller than about 1 μm, for example. It should be noted that when the ceramic portion 10g is too thin, voltage resistance is lowered in some cases. Accordingly, the thickness of the ceramic portion 10g is preferably equal to or larger than about 0.3 μm, for example. The total number of the inner electrodes 11 and 12 is preferably equal to or larger than about 350, for example.

The first inner electrodes 11 extend along the length direction L and the width direction W. The first inner electrodes 11 extend to the first end surface 10e. The first inner electrodes 11 do not extend to the first and second main surfaces 10a and 10b, the first and second side surfaces 10c and 10d, and the second end surface 10f.

The second inner electrodes 12 extend along the length direction L and the width direction W. The second inner electrodes 12 extend to the second end surface 10f. The second inner electrodes 12 do not extend to the first and second main surfaces 10a and 10b, the first and second side surfaces 10c and 10d, and the first end surface 10e.

Each of the first and second inner electrodes 11 and 12 contains metal, in particular, ferromagnetic metal. Specific examples of the preferably used ferromagnetic metal include Ni, Fe, and an alloy containing at least one of Ni and Fe.

A first outer electrode 13 is provided on the first end surface 10e. The first outer electrode 13 reaches portions of the first and second main surfaces 10a and 10b and the first and second side surfaces 10c and 10d from the first end surface 10e. The first outer electrode 13 is connected to the first inner electrodes 11 on the first end surface 10e.

A second outer electrode 14 is provided on the second end surface 10f. The second outer electrode 14 reaches portions of the first and second main surfaces 10a and 10b and the first and second side surfaces 10c and 10d from the second end surface 10f. The second outer electrode 14 is connected to the second inner electrodes 12 on the second end surface 10f.

Each of the first and second outer electrodes 13 and 14 includes at least one type of Pt, Au, Ag, Cu, Ni, Cr, and the like, for example.

Figure 5:
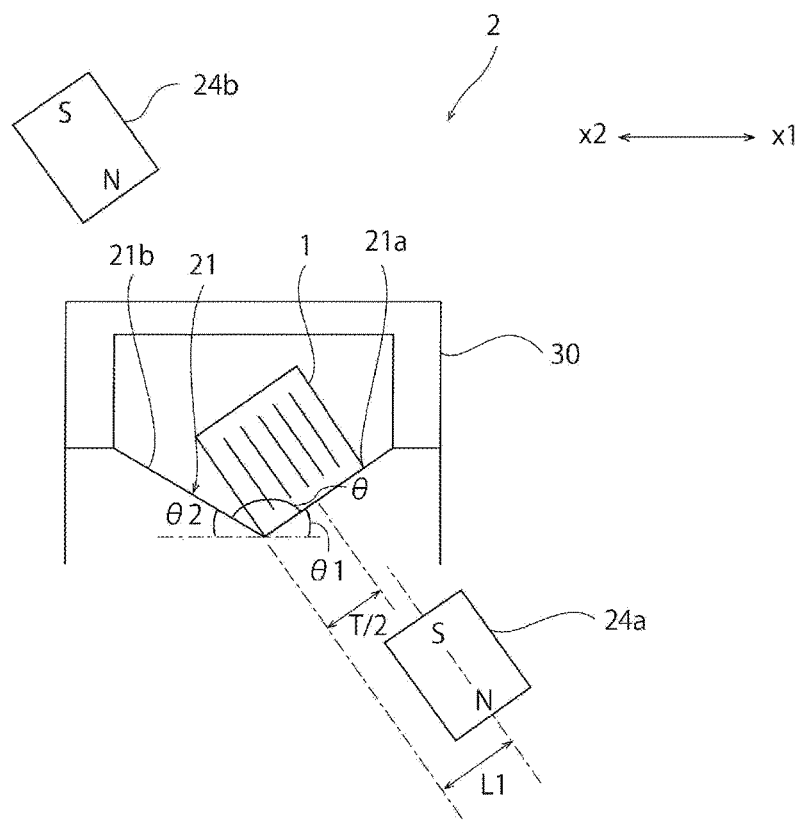
FIG. 5 is a schematic cross-sectional view illustrating the electronic component transportation device according to the first preferred embodiment of the present invention.
Figure 6:
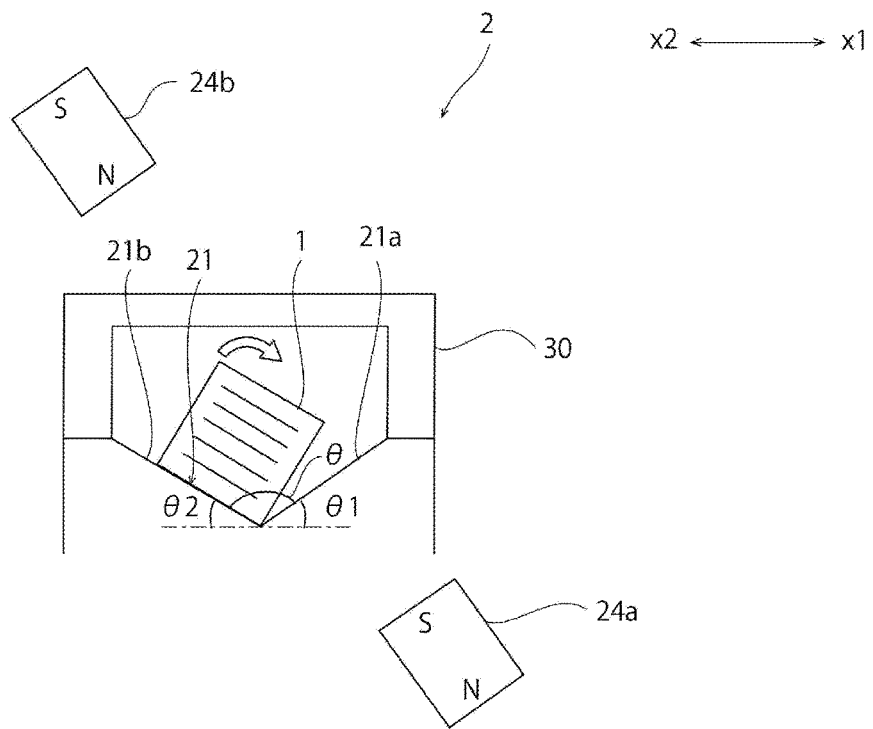
FIG. 6 is a schematic cross-sectional view illustrating the electronic component transportation device according to the first preferred embodiment of the present invention.

Next, an electronic component transportation device 2 will be described in detail with reference to FIG. 1 and FIG. 4 to FIG. 6. It should be noted that FIG. 4 to FIG. 6 are schematic cross-sectional views illustrating a rotation path when seen from the upstream side in the transportation direction.

The electronic component transportation device 2 includes a transportation path 20 (see FIG. 1). The transportation path 20 is connected to an accommodation portion (not illustrated) accommodating therein the plurality of electronic components 1. Each electronic component 1 is supplied from the accommodation portion to the transportation path 20. The electronic component 1 transported in the transportation path 20 is inserted into an insertion portion (not illustrated) for inserting the electronic component 1.

The electronic component 1 is transported in the transportation path 20 along the length direction L of the electronic component 1. A rotation path 21 is provided in the transportation path 20.

Figure 4:
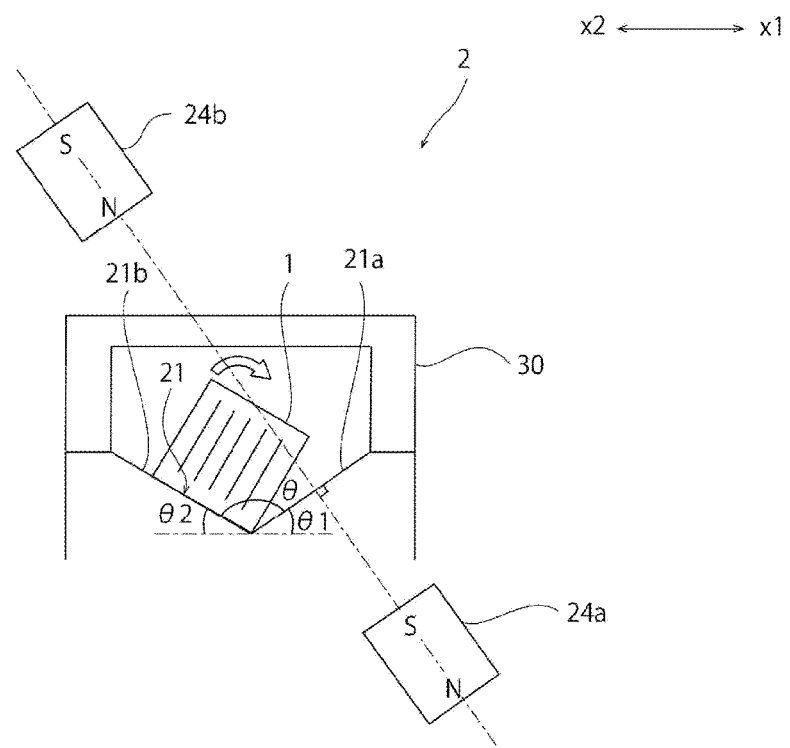
FIG. 4 is a schematic cross-sectional view illustrating the electronic component transportation device according to the first preferred embodiment of the present invention.

As illustrated in FIG. 4, the rotation path 21 includes a first surface 21a and a second surface 21b. The first surface 21a extends along the transportation direction of the electronic component 1 and is inclined with respect to the horizontal direction. That is to say, the first surface 21a defines an angle that is not equal to about 0° or about 90° with respect to the horizontal direction. The second surface 21b extends along the transportation direction of the electronic component 1 and is inclined with respect to the horizontal direction. That is to say, the second surface 21b defines an angle that is not equal to about 0° or about 90° with respect to the horizontal direction. The first surface 21a extends toward the second surface 21b from the upper end to the lower end. The second surface 21b extends toward the first surface 21a from the upper end to the lower end. The first and second surfaces 21a and 21b intersect with each other. That is to say, the first surface and second surface 21a and 21b define a V-shaped or substantially V-shaped groove on a cross section perpendicular or substantially perpendicular to the transportation direction and the vertical direction. Each of the first surface 21a and the second surface 21b is a flat surface. An angle θ defined by the first surface 21a and the second surface 21b is larger than about 90°, for example.

When an angle of the first surface 21a with respect to the horizontal direction, which is defined as an acute angle, is assumed to θ1 and an angle of the second surface 21b with respect to the horizontal direction, which is defined as an acute angle, is assumed to θ2, θ1 and θ2 may be the same as or different from each other but it is preferable that θ1 be larger than θ2. For example, θ1 preferably is equal to or larger than about 20° and equal to or smaller than about 55° preferably, and equal to or larger than about 30° and equal to or smaller than about 45° more preferably. For example, θ2 preferably is equal to or larger than about 10° and equal to or smaller than about 45° preferably, and equal to or larger than about 20° and equal to or smaller than about 35° more preferably. The difference between θ1 and θ2 is preferably equal to or larger than about 1° and equal to or smaller than about 30° preferably and is equal to or larger than about 10° and equal to or smaller than about 20° more preferably.

A first magnetic force generator 24a is arranged at one lateral side of the rotation path 21. To be specific, the first magnetic force generator 24a is arranged at the lateral side (x1 side) of the first surface 21a. To be more specific, the first magnetic force generator 24a is arranged such that a center line passing through an N pole and an S pole thereof is inclined with respect to the horizontal direction and one surface of the S pole and the N pole thereof is parallel or substantially parallel to the first surface 21a. The first magnetic force generator 24a is arranged such that the center line passing through the S pole and the N pole thereof and the first surface 21a are perpendicular or substantially perpendicular to each other.

A second magnetic force generator 24b is arranged at the other lateral side of the rotation path 21. To be specific, the second magnetic force generator 24b is arranged at the lateral side (x2 side) of the second surface 21b. To be more specific, the second magnetic force generator 24b is arranged such that a center line passing through an N pole and an S pole thereof is inclined with respect to the horizontal direction and one surface of the S pole and the N pole thereof is parallel or substantially parallel to the second surface 21b. The second magnetic force generator 24b is arranged such that the center line passing through the N pole and the S pole and the first surface 21a are perpendicular or substantially perpendicular to each other. The second magnetic force generator 24b is arranged at the downstream side relative to the first magnetic force generator 24a in the transportation direction of the electronic component 1. Magnetic force of the second magnetic force generator 24b is weaker than magnetic force of the first magnetic force generator 24a. When seen from the transportation direction of the electronic component 1, the center line passing through the N pole and the S pole of the first magnetic force generator 24a passes through the second magnetic force generator 24b. The center line passing through the N pole and the S pole of the second magnetic force generator 24b passes through the first magnetic force generator 24a. The center line of the first magnetic force generator 24a and the center line of the second magnetic force generator 24b are located on one straight line.

It is possible that only the first magnetic force generator may be provided in a preferred embodiment of the present invention.

Each of the first magnetic force generator 24a and the second magnetic force generator 24b generates magnetic force. Each of the first magnetic force generator 24a and the second magnetic force generator 24b may include a permanent magnet or an electromagnet, for example.

The electronic component 1 is transported from the upstream side to the downstream side in the rotation path 21 by being made to vibrate, for example. The electronic component 1 is transported in a state in which any surface of the first and second main surfaces 10a and 10b and the first and second side surfaces 10c and 10d extends along the first or second surface 21a or 21b. When θ1 is larger than θ2, the electronic component 1 is easily transported in a state in which any surface of the first and second main surfaces 10a and 10b and the first and second side surfaces 10c and 10d extends along the second surface 21b. From the viewpoint that the electronic component 1 is made easier to be transported in the state of extending along the second surface 21b, θ1 is larger than θ2 by equal to or more than about 1° preferably, and by equal to or more than about 10° more preferably, for example.

As illustrated in FIG. 4, when the lamination direction of the inner electrodes 11 and 12 of the electronic component 1 transported to the rotation path 21 is parallel or substantially parallel to the second surface 21b, that is, when the first or second side surface 10c or 10d of the electronic component 1 extends along the second surface 21b, the electronic component 1 rotates about the length direction L with the magnetic force generated by the first magnetic force generator 24a. Then, as illustrated in FIG. 5, the first or second side surface 10c or 10d of the electronic component 1 extends along the first surface 21a finally, and the lamination direction of the inner electrodes 11 and 12 and one surface of the S pole and the N pole of the first magnetic force generator 24a are parallel or substantially parallel with each other. The electronic component 1 that has passed through the rotation path is transported to the downstream side in the transportation path 20 in a state of extending along the first surface 21a.

As illustrated in FIG. 6, even when the electronic component 1 is transported to the rotation path 21 in a state in which the lamination direction of the inner electrodes 11 and 12 is perpendicular or substantially perpendicular to the second surface 21b, the electronic component 1 slightly rotates about the length direction L with the magnetic force generated by the first magnetic force generator 24a, and is transported to the downstream side in the transportation path 20 in a state of being along the first surface 21a as illustrated in FIG. 5. Thus, in the electronic component transportation device 2, when the lamination direction of the inner electrodes 11 and 12 of the electronic component 1 transported to the rotation path 21 is parallel or substantially parallel with or is perpendicular to the second surface 21b, as illustrated in FIG. 5, the electronic component 1 is transported in the state in which the lamination direction of the inner electrodes 11 and 12 of the electronic component 1 is parallel or substantially parallel to the first surface 21a, that is, in the state in which the first or second side surface 10c or 10d of the electronic component 1 extends along the first surface 21a.

It should be noted that when the electronic component transported to the rotation path 21 makes contact with the first surface 21a and the first or second side surface 10c or 10d of the electronic component 1 extends along the second surface 21b, the electronic component 1 does not rotate in the rotation path 21.

As described above, in the electronic component transportation device 2, the electronic component 1 rotates even without a gap to rotate the electronic component 1 and the lamination direction of the inner electrodes 11 and 12 of the electronic component 1 is aligned in the rotation path 21. The electronic component 1 before reaching a region in which the first magnetic force generator 24a is provided is transported along the first or second surface 21a or 21b extending along the transportation direction. Thereafter, the electronic component 1 that has rotated in the rotation path 21 and the electronic component 1 that has not rotated therein are transported in the rotation path 21 along the first surface 21a. Therefore, the length direction L of the electronic component 1 is unlikely to tilt with respect to the transportation direction. Accordingly, the electronic component 1 is unlikely to be stuck in the rotation path 21.

The electronic component transportation device 2 includes the second magnetic force generator 24b in addition to the first magnetic force generator 24a. The second magnetic force generator 24b is arranged at the downstream side relative to the first magnetic force generator 24a. Therefore, the lamination direction of the inner electrodes 11 and 12 of the electronic component 1 that has passed through the rotation path is aligned more reliably. Furthermore, the state in which the electronic component 1 extends along the first surface 21a in the rotation path 21 is able to be held. Accordingly, the electronic component 1 is more unlikely to be stuck in the rotation path 21.

From the viewpoint that the electronic component 1 is made easy to rotate, the angle θ defined by the first surface 21a and the second surface 21b is larger than about 90° preferably, and θ1 is larger than θ2 preferably, for example. In this case, the electronic component 1 is made easy to be transported along the second surface 21b in the rotation path 21 and the first surface 21a and the electronic component 1 are separated from each other. Therefore, the electronic component 1 is made easy to rotate.

From the viewpoint that the electronic component 1 is made easier to rotate, θ is equal to or larger than about 91° preferably, and equal to or larger than about 100° more preferably, for example. It should be noted that θ is too large, the electronic component 1 tends to tilt during the transportation. Accordingly, θ is equal to or smaller than about 120° preferably, and equal to or smaller than about 110° more preferably, for example.

From the viewpoint that the electronic component 1 is made easier to rotate, as illustrated in FIG. 5, the first magnetic force generator 24a is preferably arranged such that a center line S passing through the N pole and the S pole of the first magnetic force generator 24a passes through the first surface 21a. To be specific, a relation between a minimal distance L1 between an intersection of the center line S and the first surface 21a and an intersection of the first and second surfaces and a height H of the electronic component 1 satisfies L1>H/2 preferably.

The electronic component transportation device 2 includes a cover 30. This prevents sticking-out of the electronic component 1 that is transported from the rotation path 21 and needless displacement thereof in the rotation path 21.

Hereinafter, other examples of preferred embodiments of the present invention will be described. In the following description, common reference numerals denote members having substantially common functions to those in the above-described first preferred embodiment and description thereof is omitted.

Second Preferred Embodiment

Figure 7:
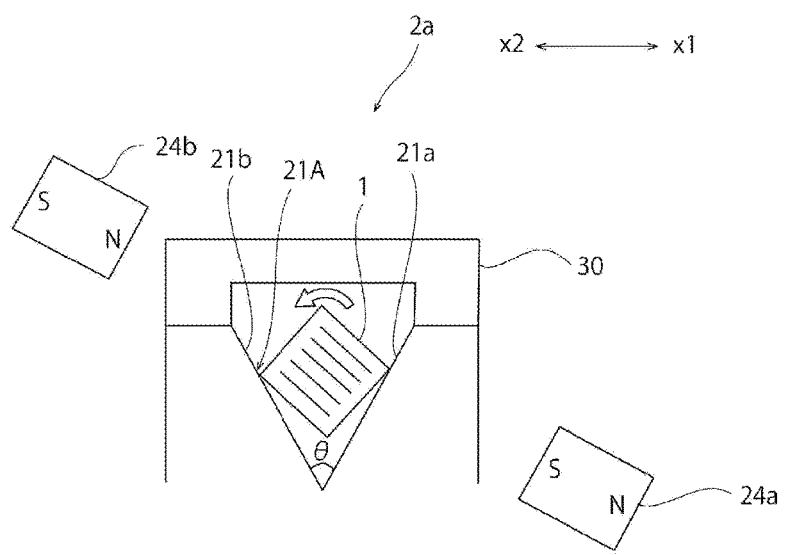
FIG. 7 is a schematic cross-sectional view illustrating an electronic component transportation device according to a second preferred embodiment of the present invention.

FIG. 7 is a schematic cross-sectional view illustrating a rotation path 21A according to a second preferred embodiment of the present invention. To be specific, FIG. 7 is a schematic cross-sectional view illustrating the rotation path 21A when seen from the upstream side in the transportation direction. A transportation device 2a in the present preferred embodiment is different from the transportation device 2 in the first preferred embodiment in a point that the angle defined by the first surface 21a and the second surface 21b is smaller than about 90°, for example.

In the present preferred embodiment, the angle defined by the first surface 21a and the second surface 21b preferably is smaller than about 90°, for example. In this case, the electronic component 1 is transported in a state of making contact with both of the first and second surfaces 21a and 21b, to be specific, in a state of making substantially point contact therewith. Therefore, displacement of the electronic component in the horizontal direction during transportation is restricted and tilt of the length direction L of the electronic component 1 with respect to the transportation direction is prevented. Accordingly, the electronic component 1 is unlikely to be stuck in the transportation path 20. Furthermore, the angle defined by the first and second surfaces 21a and 21b preferably is smaller than about 90°, for example. Therefore, a contact area between the electronic component 1 and the rotation path 21A is small. Accordingly, the electronic component 1 is able to be made to rotate easily.

From the viewpoint that the sticking of the electronic component 1 is reduced or prevented more effectively, θ is equal to or smaller than about 89° preferably, and equal to or smaller than about 75° more preferably, for example. It should be noted that when θ is too small, the electronic component 1 excessively rotates. Accordingly, θ is equal to or larger than about 30° preferably, and equal to or larger than about 45° more preferably, for example.

The first preferred embodiment has described a non-limiting example in which θ is equal to or larger than about 90° and the second preferred embodiment has described a non-limiting example in which θ is equal to or smaller than about 90°. It should be noted that the present invention is not limited thereto. θ may be 90°, for example.

Third Preferred Embodiment

Figure 8:
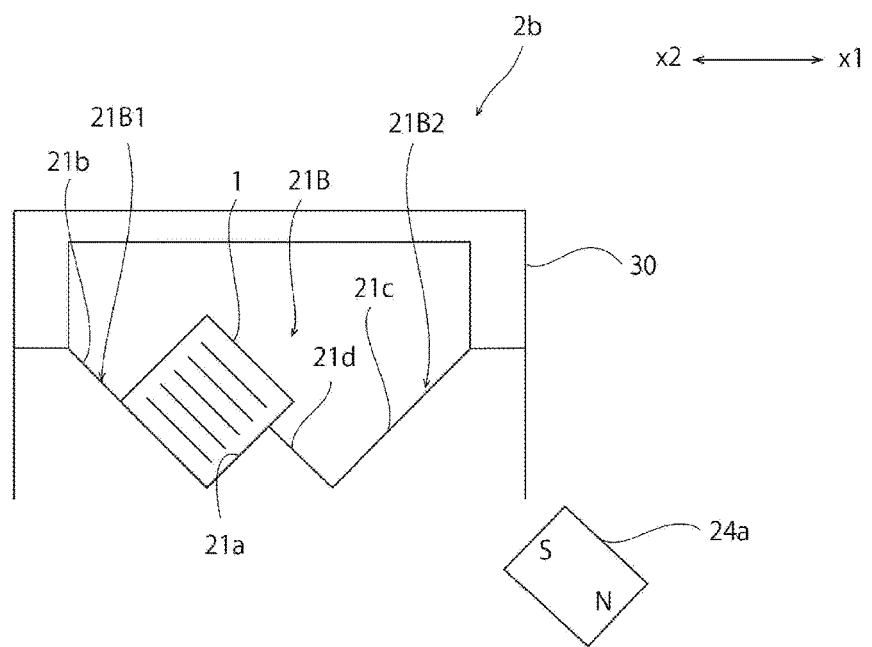
FIG. 8 is a schematic cross-sectional view illustrating an electronic component transportation device according to a third preferred embodiment of the present invention.
Figure 9:
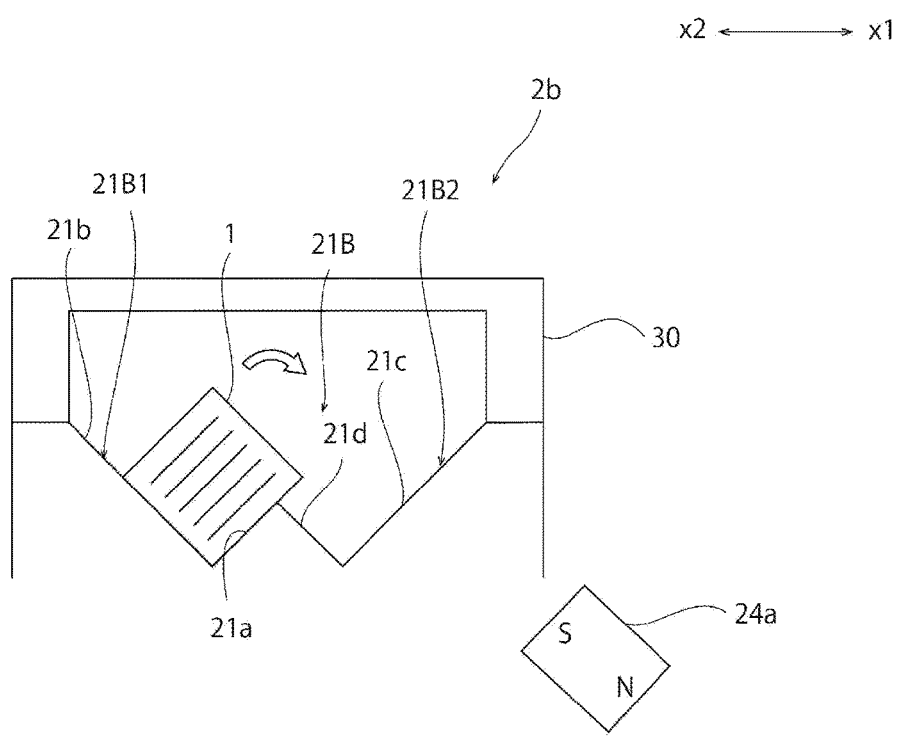
FIG. 9 is a schematic cross-sectional view illustrating the electronic component transportation device according to the third preferred embodiment of the present invention.
Figure 10:
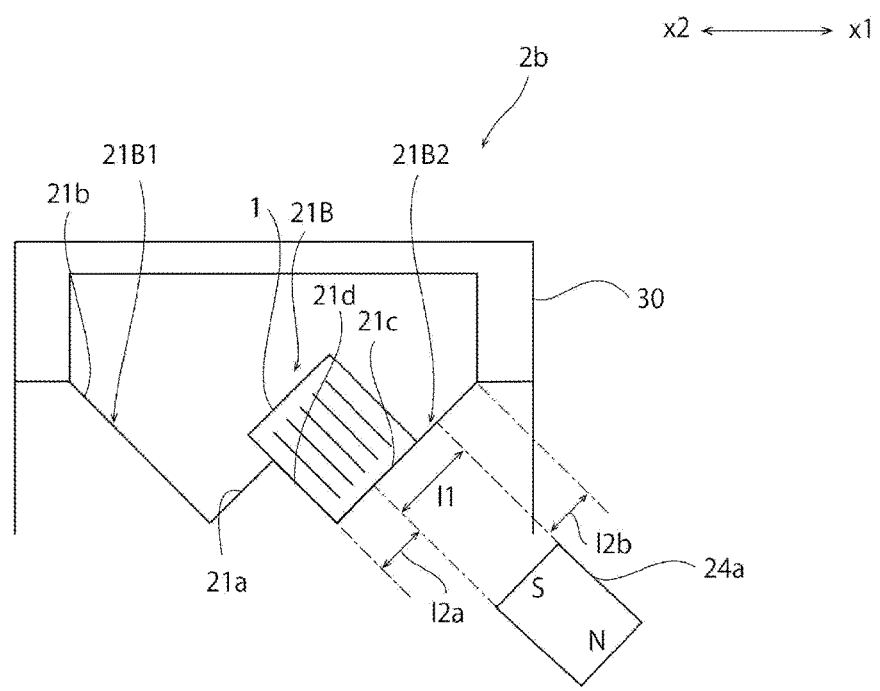
FIG. 10 is a schematic cross-sectional view illustrating the electronic component transportation device according to the third preferred embodiment of the present invention.

FIGS. 8 to 10 are schematic cross-sectional views illustrating an electronic component transportation device 2b according to a third preferred embodiment of the present invention. It should be noted that FIGS. 8 to 10 are schematic cross-sectional views illustrating a rotation path when seen from the upstream side in the transportation direction.

As illustrated in FIG. 8 to FIG. 10, in the third preferred embodiment, a rotation path 21B includes a first path portion 21B1 and a second path portion 21B2.

The first path portion 21B1 has the first surface 21a and the second surface 21b intersecting with each other. Each of the first and second surfaces 21a and 21b extends along the transportation direction of the electronic component 1 and is inclined with respect to the horizontal direction. That is to say, each of the first and second surfaces 21a and 21b defines an angle that is not equal to about 0° or about 90° with respect to the horizontal direction. The first surface 21a extends toward the second surface 21b from the upper end to the lower end. The second surface 21b extends toward the first surface 21a from the upper end to the lower end. The first surface 21a and the second surface 21b intersect with each other. That is to say, the first surface 21a and the second surface 21b define a V-shaped or substantially V-shaped groove on a transverse cross section perpendicular or substantially perpendicular to the transportation direction and the vertical direction. Each of the first and second surfaces 21a and 21b is a flat surface. The angle defined by the first surface 21a and the second surface 21b is preferably about 90°, for example.

The second path portion 21B2 is located at a lateral side (x1 side) of the first path portion 21B1. The second path portion 21B2 includes a third surface 21c and a fourth surface 21d intersecting with each other. Each of the third and fourth surfaces 21c and 21d extends along the transportation direction of the electronic component 1 and is inclined with respect to the horizontal direction. That is to say, each of the third and fourth surfaces 21c and 21d defines an angle of neither about 0° nor about 90° with respect to the horizontal direction. The third surface 21c extends toward the fourth surface 21d from the upper end to the lower end. The fourth surface 21d extends toward the third surface 21c from the upper end to the lower end. The third surface 21c and the fourth surface 21d intersect with each other. That is to say, the third surface 21c and the fourth surface 21d define a V-shaped or substantially V-shaped groove on a transverse cross section perpendicular or substantially perpendicular to the transportation direction and the vertical direction. Each of the third and fourth surfaces 21c and 21d is a flat surface. An angle defined by the third surface 21c and the fourth surface 21d is preferably about 90°, for example.

The upper end of the fourth surface 21d of the second path portion 21B2 and the upper end of the first surface 21a of the first path portion 21B1 are connected.

A minimal distance between the lower end and the upper end of the first surface 21a is smaller than a larger dimension D of the width and the height of the electronic component 1 that is transported.

The first magnetic force generator 24a is arranged at a lateral side of the rotation path 21B at the third surface 21c side. To be specific, the first magnetic force generator 24a is arranged such that one surface of the S pole and the N pole of the first magnetic force generator 24a is parallel or substantially parallel to the third surface 21c. The first magnetic force generator 24a is arranged such that the center line passing through the N pole and the S pole thereof and the third surface 21c are perpendicular or substantially perpendicular to each other. In the present preferred embodiment, only the first magnetic force generator 24a is provided and no second magnetic force generator is provided.

As illustrated in FIG. 8, the electronic component 1 is transported from the upstream side while passing through the first path portion 21B1. The electronic component 1 that has reached the rotation path 21B is transported in the first path portion 21B1 when the lamination direction of the inner electrodes 11 and 12 directs to a desired direction. In this case, the electronic component 1 is transported in a state of making contact with the first and second surfaces 21a and 21b. Therefore, the electronic component 1 is transported in a state in which the length direction L thereof extends along the transportation direction. Alternatively, the electronic component 1 moves to the second path portion 21B2 and is transported in the second path portion 21B2 in a state in which the lamination direction of the inner electrodes 11 and 12 directs to a desired direction in some cases.

As illustrated in FIG. 9, the electronic component 1 that has reached the rotation path 21B moves to the second path portion 21B2 while rotating with magnetic force by the first magnetic force generator 24a, as illustrated in FIG. 10, when the lamination direction of the inner electrodes 11 and 12 does not direct to the desired direction. The electronic component 1 that has moved to the second path portion 21B2 is transported in the second path portion 21B2. In this case, the electronic component 1 is transported in a state of making contact with the third and fourth surfaces 21c and 21d. Therefore, the electronic component 1 is transported in a state in which the length direction L thereof extends along the transportation direction.

As described above, the electronic component 1 is transported in the first or second path portion 21B1 or 21B2 extending along the transportation direction. Therefore, the length direction L of the electronic component 1 is unlikely to tilt with respect to the transportation direction. Accordingly, sticking of the electronic component 1 in the transportation path 20 is significantly reduced or prevented.

From the viewpoint that the electronic component 1 is made easy to rotate in a desired direction, it is preferable that S1>S2 is satisfied when an area of a portion of a surface of the first magnetic force generator 24a facing the third surface 21c, which is overlapped with the third surface 21c in the direction perpendicular or substantially perpendicular to the third surface 21c, is assumed to be S1 and an area of a portion of the surface of the first magnetic force generator 24a facing the third surface 21c, which is not overlapped with the third surface 21c, is assumed to be S2.

Fourth Preferred Embodiment

Figure 11:
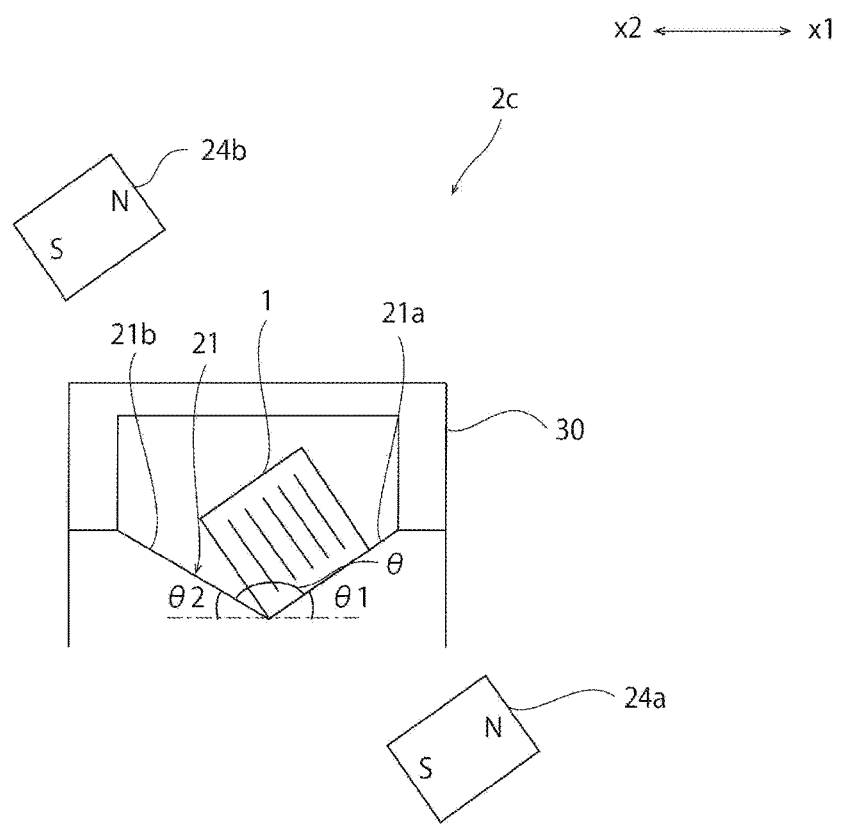
FIG. 11 is a schematic cross-sectional view illustrating an electronic component transportation device according to a fourth preferred embodiment of the present invention.

FIG. 11 is a schematic cross-sectional view illustrating a transportation device 2c according to a fourth preferred embodiment of the present invention. It should be noted that FIG. 11 is a view when seen from the upstream side in the transportation direction of the electronic component 1.

In a preferred embodiment of the present invention, it is sufficient that the first and second magnetic force generators 24a and 24b are arranged so as to cause magnetic lines thereof to pass through the electronic component 1 passing through the rotation path 21. The first to third preferred embodiments have described the case in which the first and second magnetic force generators 24a and 24b preferably are arranged such that the center line passing through the N pole and the S pole is perpendicular or substantially perpendicular to the opposing surface. The present invention is however not limited to this configuration.

In the fourth preferred embodiment, as illustrated in FIG. 11, the first magnetic force generator 24a is arranged such that one surface of the S pole and the N pole thereof is perpendicular or substantially perpendicular to the first surface 21a and the second magnetic force generator 24b is arranged such that one surface of the S pole and the N pole thereof is perpendicular or substantially perpendicular to the second surface 21b. Each of the first and second magnetic force generators 24a and 24b is arranged such that the center line passing through the S pole and the N pole is parallel or substantially parallel to the opposing surface. Even in this case, the electronic component 1 is able to be made to rotate such that the lamination direction of the inner electrodes 11 and 12 of the electronic component 1 extends in a desired direction.

Furthermore, a straight line connecting the S pole and the N pole of the first magnetic force generator 24a may be along the transportation direction of the electronic component 1.

Fifth Preferred Embodiment

Figure 12:
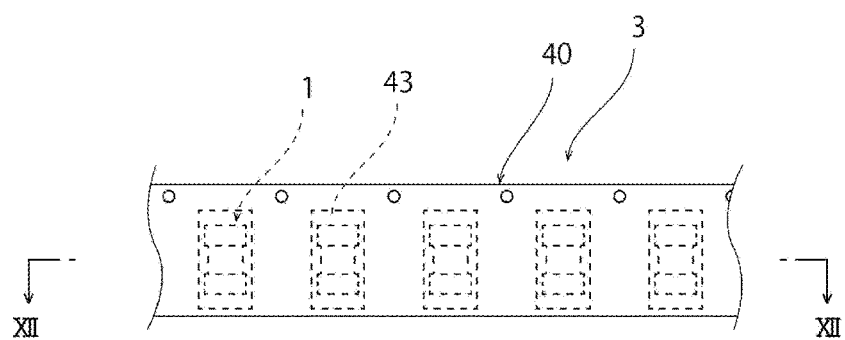
FIG. 12 is a schematic cross-sectional view illustrating an electronic component array according to a fifth preferred embodiment of the present invention.
Figure 13:
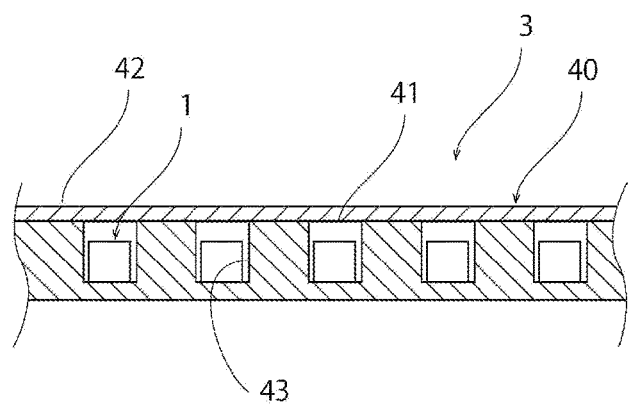
FIG. 13 is a schematic cross-sectional view cut along a line XII-XII in FIG. 12.

An electronic component array 3 as illustrated in FIG. 12 and FIG. 13 is formed by taping the plurality of electronic components 1. The electronic component array 3 includes an elongated tape 40. As illustrated in FIG. 13, the tape 40 includes an elongated carrier tape 41 and an elongated cover tape 42. The carrier tape 41 includes a plurality of cavities 43 provided at an interval along the lengthwise direction. The cover tape 42 is provided on the carrier tape 41 so as to cover the plurality of cavities 43. The electronic component 1 is accommodated in each of the plurality of cavities 43. For example, the plurality of electronic components 1 are arranged such that the second main surfaces 10b face the bottom surface sides of the cavities 43. With this, the plurality of electronic components 1 are mounted on a wiring substrate such that the lamination directions of the inner electrodes 11 and 12 are parallel or substantially parallel to a normal line direction of the wiring substrate. Therefore, the plurality of electronic components 1 of the taping electronic component array 3 are mounted such that the first main surfaces 10a thereof are sucked and held and the second main surfaces 10b face the wiring substrate. Alternatively, the plurality of electronic components 1 are arranged such that the second side surfaces 10c face the bottom surfaces of the cavities 43. With this, the plurality of electronic components 1 are mounted such that the lamination directions of the inner electrodes 11 and 12 are perpendicular or substantially perpendicular to the normal line direction of the wiring substrate. Therefore, the plurality of electronic components 1 of the electronic component array 3 are mounted such that the first side surfaces 10c thereof are sucked and held and the first side surfaces 10c face the wiring substrate. It should be noted that the carrier tape 40 may be made of resin or paper, for example.

The electronic component array 3 is preferably manufactured as follows. For example, the lamination directions of the plurality of electronic components 1 are aligned using the transportation device 2 of the electronic components 1. Subsequently, each of the electronic components 1 is accommodated in each of the plurality of cavities 43 of the carrier tape 41. Then, the cavities 43 accommodating therein the electronic components 1 are closed by the cover tape 42. With this, the electronic component array 3 is manufactured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component transportation device comprising:
a first magnetic force generator that is arranged at one lateral side of a first surface of a rotation path; wherein
the first magnetic force generator is arranged such that a center line passing through an N pole and an S pole thereof is inclined with respect to a horizontal direction.

2. The electronic component transportation device according to claim 1, wherein the first magnetic force generator is arranged such that the center line passing through the S pole and the N pole thereof and the first surface of the rotation path are perpendicular or substantially perpendicular to each other.

3. The electronic component transportation device according to claim 1, wherein one surface of the S pole and the N pole thereof is parallel or substantially parallel to the first surface of the rotation path.

4. The electronic component transportation device according to claim 1, wherein the rotation path includes the first surface and a second surface that intersect with each other, extend along a transportation direction of an electronic component having a rectangular or substantially rectangular parallelepiped shape, and are inclined with respect to the horizontal direction.

5. The electronic component transportation device according to claim 4, wherein an angle defined by the first surface and the second surface is neither 90° nor about 90°.

6. The electronic component transportation device according to claim 4, wherein an angle defined by the first surface and the second surface is larger than about 90°.

7. The electronic component transportation device according to claim 4, wherein an angle defined by the first surface and the second surface is 90°.

8. The electronic component transportation device according to claim 4, wherein an inclination angle of the first surface with respect to the horizontal direction is larger than an inclination angle of the second surface with respect to the horizontal direction.

9. The electronic component transportation device according to claim 4, wherein
the center line passing through the N pole and the S pole of the first magnetic force generator passes through the first surface; and
L1>D/2 is satisfied when a minimal distance between an intersection of the center line and the first surface and an intersection of the first and second surfaces is L1 and a larger dimension of a width and a height of the electronic component is D.

10. The electronic component transportation device according to claim 4, further comprising a second magnetic force generator at a lateral side of the second surface in the rotation path and at a downstream side relative to the first magnetic force generator.

11. The electronic component transportation device according to claim 1, further comprising a cover covering the rotation path.

12. A method for manufacturing an electronic component array comprising aligning lamination directions of a plurality of electronic components using the electronic component transportation device according to claim 1.

13. The method for manufacturing the electronic component array according to claim 12, further comprising accommodating in a tape the plurality of electronic components in which the lamination directions thereof have been aligned.

* * * * *